H. GARDINER.
Car Axle.
No. 20,419. Patented June 1, 1858.
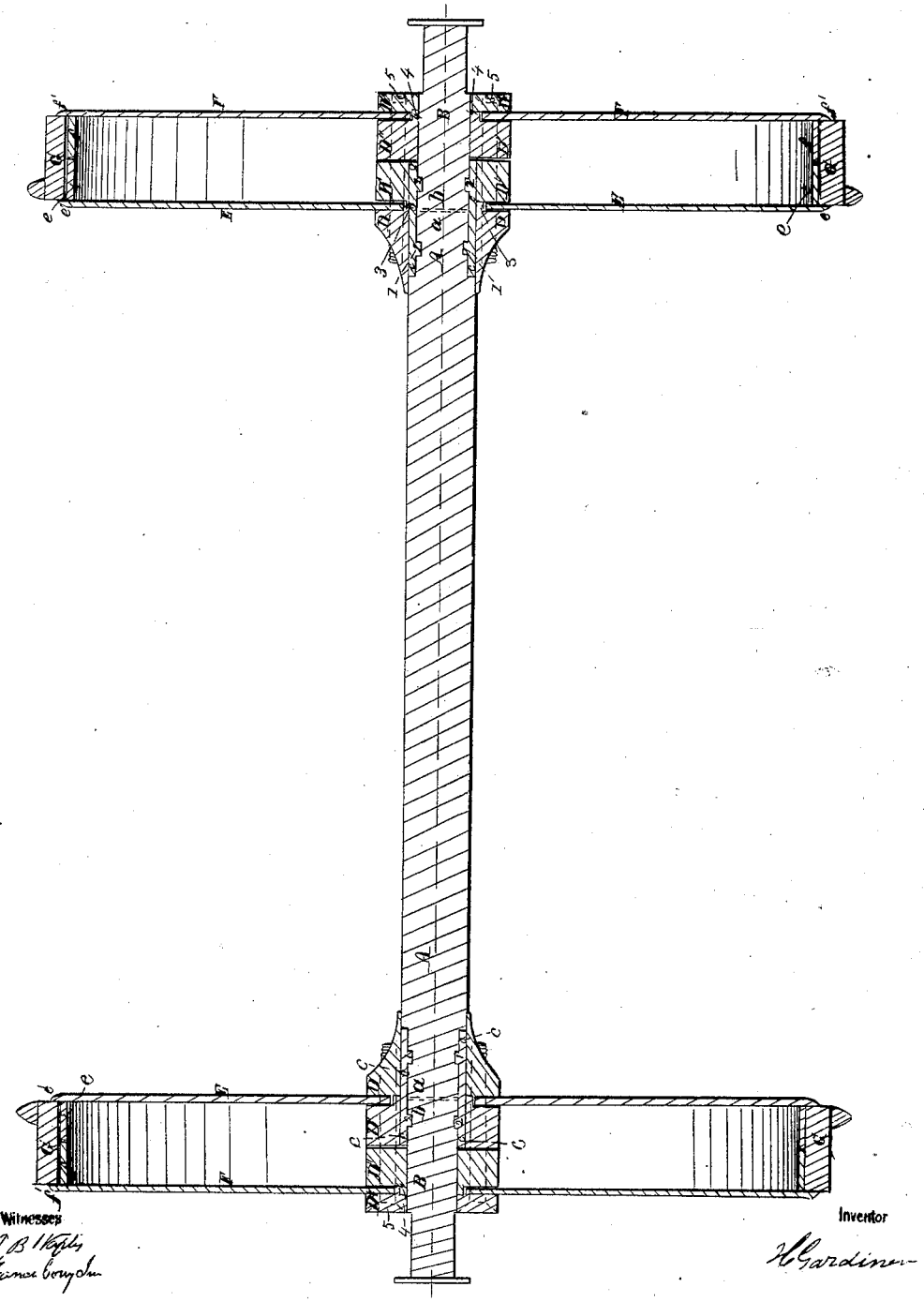

UNITED STATES PATENT OFFICE.

H. GARDINER, OF NEW YORK, N. Y.

COMPOUND RAILROAD-AXLE.

Specification of Letters Patent No. 20,419, dated June 1, 1858.

*To all whom it may concern:*

Be it known that I, HEMAN GARDINER, of the city, county, and State of New York, have invented new and useful Improvements in the Railroad-Car Compound Axle, Hub, and Wheel, and that the following is a full and exact description of my said invention and improvements, reference being had to the accompanying drawing, forming part of this my specification.

Figure 1, represents the compound axle, hub, and wheel, complete together, by a vertical cross section, through the center of wheel, hub, and axle.

For the purpose of rendering my description of my invention the more complete and intelligible, I shall in this specification describe the whole of my improvements in the hub and axle, as well as those which exclusively appertain to the wheel, although I shall herein confine my claim to the compound hub and axle reserving the claim for wheel for a separate patent.

The nature of my invention so far as the compound hub and axle are concerned, consists in arranging the parts constituting the hub, in connection with a sleeve or sheath (also within the hub) over the joint so as to hold the parts together with sufficient strength, and so as to permit the wheels to turn independently of each other, and of the other two parts of the axle when it is desired that they should do so, but at all other times and for the most part the two wheels and the whole compound axle to make their rotation together.

The principal and main part of the axle is constructed in the usual way and any ordinary rail road car axle may be taken to form this part of the axle, with slight alterations. It extends across from wheel to wheel as shown at A, A. The two ends $a$, $a$, of this part of the axle are turned down to a smaller diameter than the main part, so as to form a rabbet, and within this part again is cut around the axle a grooved ring or recess as shown at 1, 1. The other parts B, B, of the axle, are constructed with the projecting journal at the outer end, and the inner end having a rabbet $b$, similar to and of the same diameter as $a$, $a$, and upon this rabbet is cut or sunk the grooved ring or recess 2, 2, corresponding and parallel with 1, 1.

For the purpose of holding the parts A and B together a cylinder $c$, $c$ divided longitudinally into semi-cylinders is placed around the rabbets formed upon the ends of the two axle pieces, and on the interior surface of the semi-cylinders are two raised rings or projections made to fit the grooved rings 1, 1; 2, 2. These parts are held in position to revolve or not, together, as desired, by the compound hub, the construction of which I will now describe. This hub is composed of four rings or parts, designated in the drawing as D, D', D'', D'''. The inner ring D is made of a partially conical shape, and is made to cover a portion of the cylindrical pieces $c$, $c$, and a small part of main axle A, upon both of which it is fitted with the greatest accuracy; its inner face is flush with the outer surface of the inside plate of the wheel as far as the ring extends upon it, except immediately at the bottom or central part where it has a square notch or rabbet all around as seen at 3, 3. This part of the hub is, when the axle and wheel are being put together, first placed upon the axle.

At the opposite side of the inside plate E of the wheel and over the cylindrical parts $c$, $c$, and close to the inner face of the plate is placed the ring D'. The central part of this ring D' has a projection or flange all around to fit into and close square notch 3 leaving a space between D and D' for the inside wheel plate E which plate at its center rests upon the square projection or flange just described; this ring D' is turned to fit upon the cylindrical parts which it covers with the greatest accuracy. By the side of D' is placed the ring D'' fitted accurately upon the axle piece B upon which it is forced or pressed by adequate power so as to be fast to it. This ring D'' has at its central face all around a projection or flange upon which the outer plate F rests at its center as seen at 4, 4. The ring or exterior hub piece D''' is placed upon the axle piece B outside the plate F and close to its face.

In putting the wheel and hub together the ring D is first placed upon the axle and cylindrical pieces; then the wheel plate E; then the ring D'; then ring D''; then wheel plate F; then the exterior hub ring D'''.

The two plates of the wheel (of boiler plate iron) are made at their outer edges or peripheries with a projecting flange inward ($e$, $f$) for the tire to rest upon and a projecting flange over the side of the tire as at ($f'$, $e'$).

The tire is shown at G.

The tire is heated and put in its place before the exterior wheel plate is bolted and brought to its proper bearing and the tire is shrunk on in the usual manner.

Four screw bolts two of which are shown at 5, 5, pass through the parts of the hub above described and the plates and being screwed up as tight as desired their ends are upset and countersunk into D. The plates are also secured near the tire by screw bolts passing through them which are upset and countersunk.

Having thus described my invention and improvements, what I claim therein as my invention and which I desire to secure by Letters Patent of the United States, is—

The combination and arrangement of the hub cylindrical parts $c$, $c$, and axle parts, so that all may rotate together; or one wheel and short axle independently, as described.

H. GARDINER.

Witnesses:
J. B. STAPLES,
E. FRANCIS COVEY, Jr.